United States Patent [19]

Sperry

[11] 3,910,620
[45] Oct. 7, 1975

[54] HIGH TEMPERATURE VACUUM PAD LIFT
[75] Inventor: Gene Sperry, Salem, Ill.
[73] Assignee: American Chain & Cable Company, Inc., Bridgeport, Conn.
[22] Filed: Apr. 15, 1974
[21] Appl. No.: 460,881

[52] U.S. Cl. ............... 294/64 R; 248/362; 269/21
[51] Int. Cl.² ........................................ B66C 1/02
[58] Field of Search ............ 294/64 R, 65; 161/192, 161/202; 214/1 BS, 650 SG; 248/362, 363; 269/21

[56] References Cited
UNITED STATES PATENTS

| | | |
|---|---|---|
| 3,347,327 | 10/1967 | Engelen et al. ............... 294/64 R X |
| 3,479,207 | 11/1969 | Marzocchi ...................... 161/202 X |
| 3,627,369 | 12/1971 | Nixon .............................. 294/64 R |
| 3,769,146 | 10/1973 | Ravel .............................. 161/192 X |
| 3,776,809 | 12/1973 | Baumler et al. ................. 161/192 X |

Primary Examiner—Evon C. Blunk
Assistant Examiner—Johnny D. Cherry
Attorney, Agent, or Firm—Barnes, Kisselle, Raisch & Choate

[57] ABSTRACT

A high temperature lifting pad comprising a body and a ring on said body made of elastomeric material. The ring has an exposed surface for contacting an article to be lifted and a layer of quartz cloth is bonded to said exposed surface.

6 Claims, 4 Drawing Figures

U.S. Patent  Oct. 7,1975  3,910,620
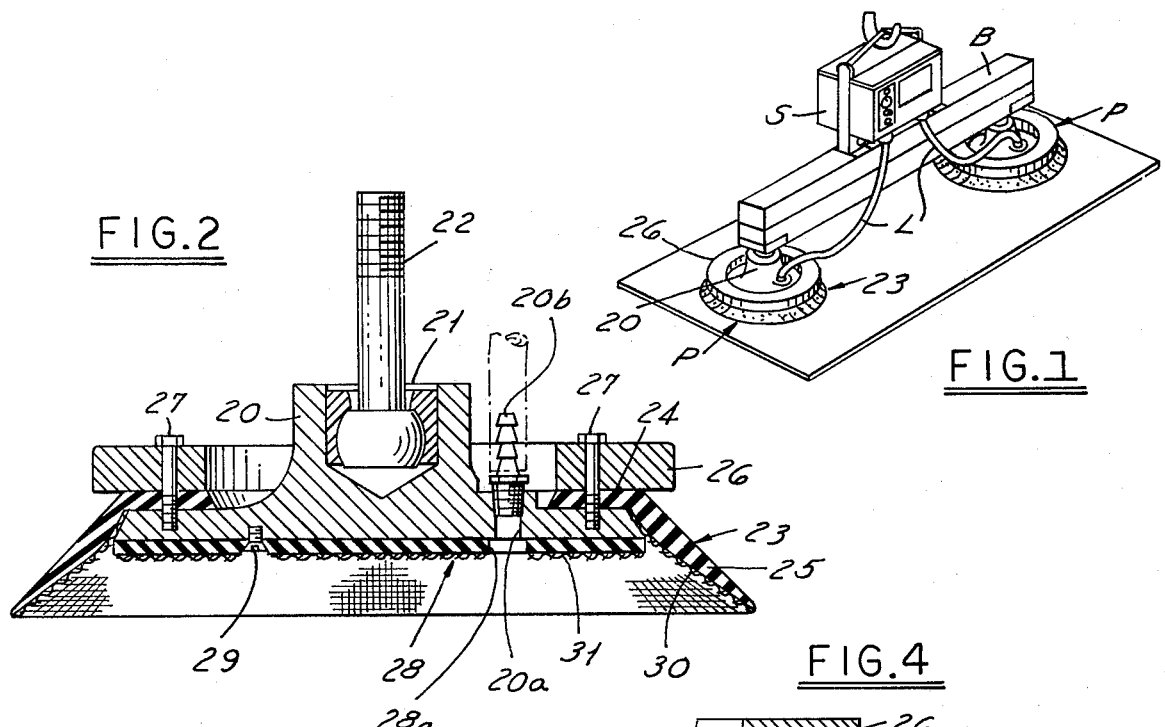
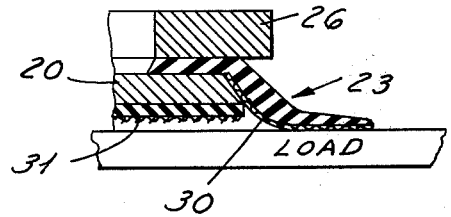
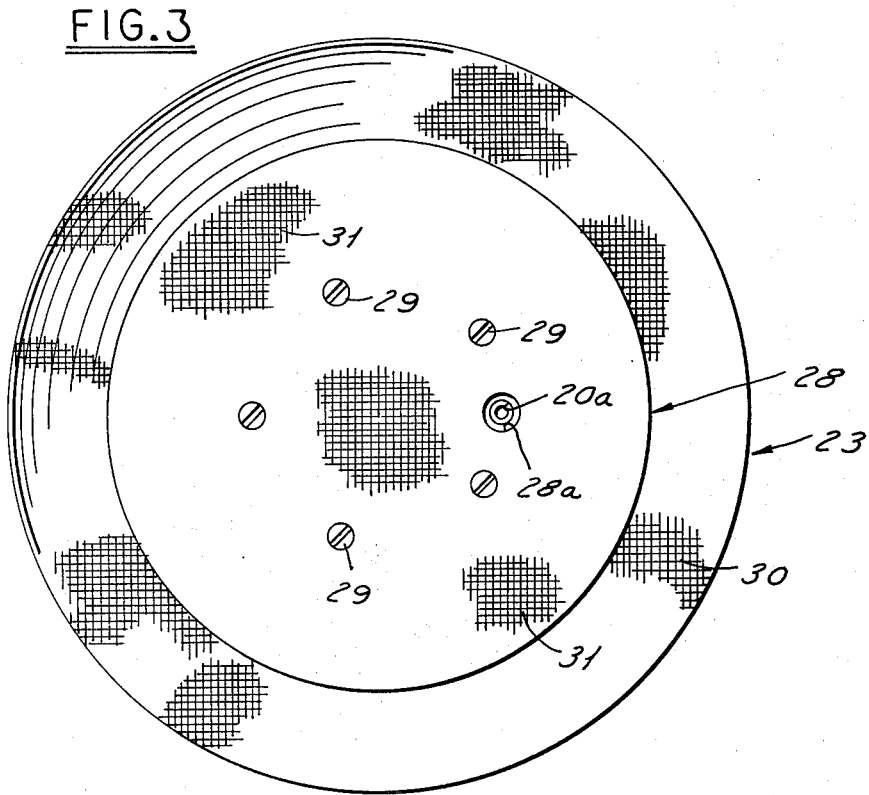

HIGH TEMPERATURE VACUUM PAD LIFT

This invention relates to vacuum lifting apparatus and particularly to the vacuum pads utilized in connection with such apparatus.

BACKGROUND OF THE INVENTION

In lifting of articles for movement between manufacturing operations, it is common to utilize a vacuum pad that normally comprises a resilient ring which engages the article and vacuum means for creating a vacuum in the space surrounded by the ring.

When the articles being lifted are hot, conventional resilient materials are unable to withstand the temperatures for prolonged periods of time. Thus, it has been suggested that an asbestos sheet be mounted on the pad by spring means as in U.S. Pat. No. 3,307,869. It has also been suggested that aluminum foil be combined with an asbestos sheet as shown in U.S. Pat. No. 3,627,369.

Among the objects of the invention are to provide a simple construction which will withstand the high temperatures, which is readily assembled and disassembled, and which can be easily serviced.

DESCRIPTION OF THE DRAWINGS

FIG. 1 is a perspective view of an apparatus embodying the invention.

FIG. 2 is a vertical sectional view of a vacuum pad made in accordance with the invention.

FIG. 3 is a bottom plan view of the vacuum pad.

FIG. 4 is a fragmentary vertical sectional view showing the pad engaging an article for lifting.

DESCRIPTION

Referring to FIG. 1, a typical apparatus embodying the invention comprises a load beam B on which the vacuum pads P embodying the invention are mounted. A source S of vacuum is also mounted on the beam and is connected by lines L to the vacuum pads P.

Referring to FIGS. 2 and 3, each vacuum pad P comprises a rigid body 20 that is connected by a swivel joint 21 to a shaft 22 mounted on the beam B. An elastomeric ring 23 comprising a central portion 24 and an outwardly extending tapered lip 25 is mounted on the body 20 by a rigid ring 26 and screws 27. A scuff pad 28 of elastomeric material is mounted on the flat underside body by screws 29. Vacuum is applied to the space surrounded by ring 23 through openings 28a, 20a in the scuff pad 28 and body 20 which extend to fitment 20b to which line L is connected.

In accordance with the invention, layers 30, 31 or quartz cloth are molded onto the ring 23 and scuff pad 28 during manufacture thereof. The quartz cloth comprises quartz fibers which are preferably woven together.

In a typical example, the quartz cloth has the following physical characteristics:

19.5 oz./sq. yard
Thickness 0.027 inch
Thread count-warp 38, fill 24
Breaking strength-warp 325, fill 300
Weave 5-H satin The elastomeric material of which the sealing ring 23 and scuff pad 28 are made preferably comprises a silicone rubber such as that made of Dow Corning and sold under the designation "Silastic 52U" and having the following properties:

| | |
|---|---|
| Type ASTM D1418 | VMO |
| Brittle Point ASTM D746 | −73 C (−100F.) |
| Physical Form | Firm Crepe |
| Color | Tan |
| Specific gravity at 25°C (77°F/on test formulation press molded 5 minutes at 116°C. (240°F) | 1.13 ± 0.03 |
| Durometer Hardness Shore "A" | 50 ± 5. |
| Tensile Strength, P.S.I. Min. | 800 |
| Elongation, percent Min. | 300 |
| Compress set at 22 hours at 150°C (302°F.) percent Max. | 30 |

When the pad is lowered into contact with an article A to be lifted (FIG. 4), the ring 23 is deformed providing a seal so that when vacuum is applied the article can be lifted.

It has been found that when the vacuum pad is made of high temperature elastomeric material with a quartz cloth molded on one surface of the sealing ring and scuff pad, the sealing ring and scuff pad will withstand high temperatures occurring in connection with the handling of hot articles to a greater extent than has been heretofore possible with prior art structures.

I claim:

1. A high temperature lifting pad comprising
   a body,
   a ring on said body,
   said ring being made of elastomeric material,
   said ring having an exposed surface for contacting an article to be lifted,
   a layer of quartz cloth bonded to said exposed surface.

2. The combination set forth in claim 1 wherein said layer of quartz cloth is molded onto said surface.

3. The combination set forth in claim 1 wherein said elastomeric material comprises silicone rubber.

4. The combination set forth in claim 1 including a scuff pad of elastomeric material on said body surrounded by said ring and a layer of quartz cloth bonded to the exposed surface of said scuff pad.

5. The combination set forth in claim 4 wherein said elastomeric material of said scuff pad comprises silicone rubber.

6. A high temperature lifting pad comprising
   a body,
   a ring on said body,
   said ring being made of elastomeric material,
   said ring having an exposed surface for contacting an article to be lifted,
   a layer of quartz cloth molded to said exposed surface,
   a scuff pad of elastomeric material on said body surrounded by said ring,
   and a layer of quartz cloth molded to the exposed surface of said scuff pad.

* * * * *